United States Patent [19]

Ichikawa et al.

[11] Patent Number: 5,270,280
[45] Date of Patent: Dec. 14, 1993

[54] PACKING MATERIAL FOR LIQUID CHROMATOGRAPHY AND METHOD OF MANUFACTURING THEREOF

[75] Inventors: Hiroshi Ichikawa; Akira Yokoyama; Takanobu Kawai, all of Yokohama; Hiroyuki Moriyama, Kudamatsu; Katsuo Komiya, Hikari; Yoshio Kato, Shinnanyou, all of Japan

[73] Assignees: Nippon Carbon Co., Ltd., Tokyo; Tosoh Corporation, Yamaguchi, both of Japan

[21] Appl. No.: 784,960

[22] Filed: Oct. 30, 1991

[30] Foreign Application Priority Data

Nov. 1, 1990 [JP] Japan .................................. 2-296974
May 30, 1991 [JP] Japan .................................. 3-127295

[51] Int. Cl.$^5$ ...................... B01J 20/20; C01B 31/04; C01B 31/00; B01D 15/08
[52] U.S. Cl. ................................ 502/437; 210/198.2; 210/656; 264/29.5; 428/332; 428/407; 502/416; 502/417; 502/418
[58] Field of Search .................... 502/8, 416, 417, 437, 502/418; 264/29.5, 29.3; 428/407; 210/656

[56] References Cited

U.S. PATENT DOCUMENTS

| | | | |
|---|---|---|---|
| 1,478,986 | 12/1923 | Morrell | 502/417 |
| 3,533,961 | 10/1970 | Voet | 252/421 |
| 4,225,463 | 9/1980 | Unger et al. | 210/656 |
| 4,228,037 | 10/1980 | Hino et al. | 502/8 |
| 5,053,278 | 10/1991 | Nakada et al. | 428/407 |
| 5,098,784 | 3/1992 | Ichikawa et al. | 210/656 |

FOREIGN PATENT DOCUMENTS

| | | |
|---|---|---|
| 2202174 | 3/1973 | Fed. Rep. of Germany . |
| 2415075 | 8/1979 | France . |
| 699470 | 11/1953 | United Kingdom . |
| 2013642 | 8/1979 | United Kingdom . |

OTHER PUBLICATIONS

P. Ciccioli and R. Tappa in "Journal of Chromatography," 206 (1981) 35-42.
K. Unger, P. Roumeliotis, H. Mueller and H. Goetz in "Journal of Chromatography," 202 (1980) 3-14.
J. Knox and B. Kaur in "Journal of Chromatography," 352 (1986) 3-25.

Primary Examiner—Paul E. Konopka
Attorney, Agent, or Firm—Armstrong, Westerman, Hattori, McLeland & Naughton

[57] ABSTRACT

A packing material for liquid chromatography is produced by mixing 1.0 part by weight of carbon black, 0.5 to 2.5 parts by weight of one or a mixture of a synthetic resin which can be graphitized by heating and a toluene- or benzene-soluble component of pitches, and an organic solvent to obtain a mixture. The carbon black has a particle diameter of 12 to 40 nm, a specific surface area of 50 to 650 m$^2$/g, a DBP oil absorption amount of 50 to 150 ml/100 g. The synthetic resin is one selected from phenol resin, furan resin, furfural resin, divinylbenzene resin and urea resin. The pitches are ones selected from petroleum pitches, coal-tar pitches and liquefied coal oil. The mixture is granulated by spray granulation or emulsion granulation to obtain granules whose ratio $L_{min}/L_{max}$ of a minor axis diameter $L_{min}$ to a major axis diameter $L_{max}$ is 0.90 to 1.0. The heat treatment of the granules is also made in an inert gas under pressure.

8 Claims, 3 Drawing Sheets

PACKING MATERIAL FOR LIQUID CHROMATOGRAPHY AND METHOD OF MANUFACTURING THEREOF

BACKGROUND OF THE INVENTION

This invention relates to a packing material for liquid chromatography and a method of manufacturing the same. In particular, this invention relates to a packing material for liquid chromatography produced by mixing carbon black and graphitizing (carbonizing) components, granulating and further heat-treating them, as well as to a method of manufacturing the same.

As a packing material for liquid chromatography, there are conventionally used a chemically bonded type of packing material based on silica gel and a packing material based on synthetic resin. The silica gel-based packing material is relatively strong in mechanical strength and is small in swelling/shrinking characteristics against various organic solvents. Therefore, it has a high resolving power and is superior in exchangeability of eluent for analysis.

However, the silica gel-based packing material has problems in that the silica gel dissolves under the acidic or alkaline conditions and that the solubility of the silica gel in an aqueous solution becomes higher under warming, resulting in a problem in durability as a packing material. The packing material of synthetic resin, on the other hand, is known to be high in acid- and alkali-resistivity, and has a good chemical durability as a packing material. However, since the mechanical strength of the particles is small and it has a swelling/shrinking characteristics against organic solvents, it has been difficult to convert them into finer particles. In addition, care must be taken in changing the analyzing conditions when a different eluent.

As raw materials which are chemically stable and are high in mechanical strength, the following are known, i.e., graphitized carbon black (as described by P. Ciccioli and R. Tappa in "Journal of Chromatography," 206 (1981) 35–42), coke powder (as disclosed by K. Unger and H. Goetz in Japanese Published Unexamined Patent Application No. 112393/1979) and activated carbon (as described by K. Unger, P. Roumeliotis, H. Mueller and H. Goetz in "Journal of Chromatography," 202 (1980) 3–14). However, they are still in the process of studying due to their stability, lifetime and complicated manufacturing processes and, in addition, what is obtained are powders of irregular forms. Therefore, it was difficult to obtain a packing material of high column efficiency as the packing material for liquid chromatography.

Further, spherical carbon packing material is manufactured by a template method based on silica gel and is available on the market (as described by J. Knox and B. Kaur in "Journal of Chromatography," 352 (1986) 3–25). It has, however, a problem in that rod-like pyrolyzed graphite is produced as by-product due to re-adhesion of gases generated at the time of manufacturing particles, and the graphite is mixed with the spherical packing material.

Still another method is known (as disclosed by Joseph Lawrence Schmitt Jr., Philip Leory Walker, Jr., George Augustus Castellion in the Japanese Published Unexamined Patent Application No. 116193/1976) in which carbon black and graphitizing (carbonizing) binder are used to obtain porous carbon particles for catalyst carrier. However, the particle shape, particle diameters or the like are not appropriate and therefore it is difficult to use it as a packing material for liquid chromatography.

SUMMARY OF THE INVENTION

This invention has an object of providing a packing material for use in liquid chromatography which has solved the above-described problems, is chemically and mechanically stable with weak adsorbing power, and is quick in eluting behavior, as well as a method of manufacturing the same.

A packing material for liquid chromatography using, as its raw material, carbon black which is superior in chemical resistance and heat resistance, has chemically stable characteristics. However, if carbon black is packed (or filled) as it is into a column, it is often crushed because the bonding among the particles is not strong enough. After diligent studies in order to strengthen the bonding among the carbon black particles, the inventors of this invention added an appropriate amount of binder to carbon black particles and then heat-treated them. As a result, the bonding among the carbon black particles was reinforced, and thus they succeeded in obtaining a packing material of improved mechanical durability.

Therefore, according to a first aspect of this invention, there is provided a packing material for liquid chromatography comprising carbon-based particles having a ratio $L_{min}/L_{max}$ of a minor axis diameter $L_{min}$ to a major axis diameter $L_{max}$ of 0.95 to 1.0, a particle diameter of 2 to 200 μm, a highly porous surface, a specific surface area of 10 to 650 m$^2$/g, a total micropore volume of 0.3 to 2.0 ml/g and a ratio $V_{0.5}/V_{1.0}$ of 0.4 or smaller ($V_{0.5}/V_{1.0}$ is the ratio of nitrogen gas adsorption volume $V_{0.5}$ at a relative pressure $P/P_0$ of 0.5 to nitrogen gas adsorption volume $V_{1.0}$ at a relative pressure $P/P_0$ of about 1.0 at nitrogen gas adsorption isotherm according to the method of Barrell et al., *J. Amer Chem. Soc.*, 73, 373 (1951)).

A process for producing the above-described packing material is also provided. The process is characterized by the steps of: mixing 1.0 part by weight of carbon black, 0.5 to 2.5 parts by weight of one or a mixture of a synthetic resin which can be graphitized (carbonized) by heating and a toluene- or benzene-soluble component of pitches, and an organic solvent to obtain a mixture, the carbon black having a particle diameter of 12 to 40 nm, a specific surface area of 50 to 650 m$^2$/g, a DBP oil absorption amount of 50 to 150 ml/100 g (using JIS K 6221, item 6.1.2, method A) the synthetic resin being one selected from phenol resin, furan resin, furfural resin, divinylbenzene resin and urea resin, the pitches being ones selected from petroleum pitches, coal-tar pitches and liquefied coal oil (i.e., oil obtained by liquefaction of coal); granulating the mixture by spray granulation or emulsion granulation to obtain granules whose ratio $L_{min}/L_{max}$ of a minor axis diameter $L_{min}$ to a major axis diameter $L_{max}$ is 0.90 to 1.0; and heat-treating the granules at 800° to 3000° C. in an inert atmosphere.

In addition, in order to strengthen the bonding among the carbon black particles, the inventors selected carbon black having appropriate characteristics, added an appropriate amount of binder, and heat-treated them under pressure. In this manner, they succeeded in obtaining a packing material which is superior in mechanical strength, prevents the tailing of samples to be eluted, and offers superior effects without using a large amount of eluent of strong eluting force.

Therefore, according to a second aspect of this invention, there is provided a packing material for liquid chromatography comprising carbon particles having a highly porous surface, a particle diameter of 2 to 200 $\mu$m, a specific surface area of 15 to 50 m$^2$/g, a total micropore volume of 0.08 to 0.3 ml/g and a ratio $V_{0.5}/V_{1.0}$ of 0.2 or smaller, the ratio being of nitrogen gas adsorption volume $V_{0.5}$ at a relative pressure $P/P_0$ of 0.5 to nitrogen gas adsorption volume $V_{1.0}$ at a relative pressure $P/P_0$ of about 1.0 at nitrogen gas adsorption isotherm.

A process for producing the above-described packing material is also provided. The process is characterized by the steps of: mixing 1.0 part by weight of carbon black, 1.0 to 3.0 parts by weight of one or a mixture of a synthetic resin which can be graphitized (carbonized) by heating, and 20% to 25% of a toluene- or benzene-soluble component of pitches, and an organic solvent to obtain a mixture, the carbon black having a particle diameter of 12 to 30 nm, a specific surface area of 80 to 250 m$^2$/g, a DBP oil absorption amount of 80 to 200 ml/100 g, said pitches being ones selected from petroleum pitches, coal-tar pitches and liquefied coal oil; granulating the mixture in a wet (emulsion) manner to obtain granules whose ratio $L_{min}/L_{max}$ of a minor axis diameter $L_{min}$ to a major axis diameter $L_{max}$ is 0.90 to 1.0; and then heat-treating the granules in an inert gas at 800° to 2600° C. under pressure of 1 to 8 kgf/cm$^2$G.

As the characteristics of carbon black, the following can be pointed out, i.e., particle size, specific surface area, and structure (which is a chain-like aggregate of several or several tens of carbon black particles and is generally measured by a DBP oil absorption amount). The characteristics of the packing material of this invention are closely related to the characteristics of this carbon black. In other words, in order for the packing material to have a high separation performance for use in liquid chromatography, it must be provided with effective micropore volumes. In the packing material of this invention, the micropores which are newly generated as a result of bonding of a plurality of carbon black particles or structures by means of the binder, are also intended to be used as effective micropores.

The carbon black to be used in the first aspect of this invention shall preferably have a particle diameter of 12 to 40 nm, a specific surface area of 50 to 650 m$^2$/g and a DBP oil absorption amount of 50 to 150 ml/100 g. In other words, if the particle diameter is smaller than 12 nm, the diameters of the micropores that can be obtained become smaller, and it becomes harder for the material to be analyzed to enter the micropores. Further, micropores will disappear in the process of heat treatment. If the particle size becomes larger than 40nm, on the other hand, the micropores to be formed among the carbon black particles or structures become larger and, consequently, the number of the effective micropores becomes smaller, resulting in a decrease or loss in the mechanical strength. If the specific surface area is below 50 m$^2$/g or above 650 m$^2$/g, the effective specific surface area of the packing material obtained becomes small and the separation capacity decreases. If the DBP oil absorption amount is below 50 ml/100 g, the particle size of the carbon black becomes larger in inverse proportion to the amount, and a packing material having a sufficient specific surface area cannot be obtained. If the DBP oil absorption amount is above 150 ml/100 g, unnecessarily large micropores are generated in the packing material or mechanical strength thereof becomes insufficient, which is not favorable.

The carbon black to be used in the second aspect of this invention shall preferably have the following characteristics, i.e., a particle diameter of 12 to 30 nm, a specific surface area of 80 to 200 m$^2$/g and a DBP oil absorption amount of 80 to 200 ml/100 g. Namely, when the particle diameter is smaller than 12 nm, it is difficult to uniformly disperse the carbon black in the binder and, therefore, a special apparatus is required in so doing. The shape of the packing material obtained is poor and is inferior to that of spherical packing material which is commercially available. A larger ratio of the binder is required in order to make the shape closer to a sphere. However, if the binder is used in above 3 parts by weight relative to the carbon black, the specific surface area and the micropore volume of the packing material obtained will become smaller, and the separation capacity will consequently be decreased. If the particle diameter of the carbon black is above 30 nm, the micropores to be formed in the carbon black particles or the structures become large, resulting in smaller effective micropores and a decreased mechanical strength. If the specific surface area of the packing material obtained is below 15 m$^2$/g, the separation capacity is low and, if it is above 50 m$^2$/g, the adsorption force is strong, resulting in a late elution and a wider peak width. The DBP oil absorption amount of below 80 ml/100 g is not enough in obtaining a packing material of sufficient specific surface area. If the amount is above 200 ml/100 g, it is difficult to make the packing material into true spheres, and is not favorable because unnecessarily large micropores are generated in the packing material, resulting in a lack of mechanical strength or the like.

In order to attain a firm bonding among the carbon black particles, it is preferable that the binder to be used in the first aspect of this invention be a synthetic resin which can be easily graphitized (carbonized) by heating. For example, phenol resin, furan resin, furfural resin, divinyl benzene resin and urea resin may be used singly or in mixture. In addition, benzene- or toluene-soluble component of pitches, such as toluene- or benzene-soluble component of oil pitches, coal-tar pitches, or liquefied coal oil (asphaltene component) may be used singly or in mixture as a binder to be used in this invention. A mixture of the above-described synthetic resin and the toluene- or benzene-soluble component of pitches may also be used in this invention. These binder constituent are added in a range of 0.5 to 2.5 parts by weight relative to 1 part by weight of carbon black. In other words, if the binder is below 0.5 part by weight, it is not sufficient to bond the carbon black particles, and therefore sufficient mechanical strength is not obtained. If the binder is above 2.5 parts by weight, it is not preferable in that the binder constituent will fill up the spaces among the particles and, consequently, that the micropores which are effective in separation will decrease.

The binder that can be used in the second aspect of this invention shall preferably be a synthetic resin that can be easily graphitized (carbonized) by heating. For example, phenol resin, furan resin, furfural resin, divinylbenzen resin and urea resin can be used singly or in mixture. Further, in order to increase the graphitization (carbonization) yield, toluene- or benzene-soluble component of petroleum pitches, coal-tar pitches or liquefied oil from coal may also be used by adding to the above-described synthetic resins. These binder compositions are mixed within a range of 1.0 to 3.0 parts by weight per 1 part by weight of carbon black. In other words, if the binder is below 1.0 part by weight, the mechanical strength of the packing material obtained is insufficient. If the binder is above 3.0 parts by weight, it is not preferable in that the micropore volumes that are effective in separation become insufficient. The pitches to be added to the binder to increase of graphitization (carbonization) yield has no effect if the amount of addition is below 10%. If the amount of addition is above 25%, it is not favorable in that the crystalline structure of the packing material after graphitization (carbonization) treatment will be changed, resulting in a change in the eluting behavior.

In order to homogenize the carbon black and the binder, it is necessary, in a preferred embodiment, to disperse them in a suitable dispersing agent. As the dispersing agent to be used, a solvent that has good wettability with either the carbon black and the binder is suitable. As the dispersing agents that can be used, the following may be pointed out, i.e., alcohols such as methanol, ethanol, propanol or the like, organic solvents of aromatic group such as benzene, toluene or the like, and general organic solvents such as acetone, methylethylketone or the like. A suitable amount of dispersing agent to be added in the first aspect of this invention is 1 to 4 parts by weight per 1 part by weight of the mixture of carbon black and binder. If the amount is below 1 part by weight, it is not preferable in that the dispersing liquid becomes too rarefied, resulting in changes of the particle shapes after granulation or in a lower strength.

In the second aspect of this invention, the dispersing agent is preferably used in an amount of 0.25 to 3.0 parts by weight per 1 part by weight of the mixture of carbon black and binder. If the amount is below 0.25 part by weight, it is not preferable in that the particle sizes of the packing material to be obtained are too large. If the amount is above 3.0 parts by weight, the particle sizes become too small.

As the granulating method in the first aspect of this invention, spray granulating method and submerged granulating method (emulsion granulating method) are suitable for obtaining spherical particles. The former method is the one in which particles are obtained by spraying a mixture liquid at an elevated temperature and evaporating a dispersing agent. The latter method is the one in which a dispersing mixture liquid is added to and mixed in a heated dispersing agent that does not come into mixture with the mixture liquid, thereby obtaining spheres.

As the granulating method in the second aspect of this invention, submerged granulating method is suitable.

The granulated particles obtained are composite bodies comprising carbon black and binder. In the first aspect of this invention, the composite bodies are heated to 800° C. to 3000° C. for graphitization (carbonization) of the binder, and consequently a packing material for liquid chromatography of this invention is obtained. If the graphitization (carbonization) temperature is below 800° C., the graphitization (carbonization) of the binder is not sufficient, resulting in an insufficient strength of the packing material. If the graphitization (carbonization) temperature is above 3000° C., it is not preferable in that the graphitization (carbonization) yield is re-markably lowered and that the strength of the packing material is decreased. This graphitizing (carbonizing) treatment is carried out in an inert gas or under vacuum. It is preferable, prior to the graphitizing (carbonizing) treatment, to first heat the granulated particles to about 150° C. to evaporate the organic binding agent in the composite particles and then to heat them to about 500° C. to harden and infusibilize the binder.

Where multitudes of micropores which are irrelevant to the separation are present, the micropores which are relatively effective in separation become less and the peaks become broad, resulting in fewer plate numbers, even if very fine perforations are present all over the packing material and a sufficient value may have been attained as a packing material for liquid chromatography in point of specific surface area according to BET. This is not preferable. Therefore, the packing material obtained is made such that the ratio $V_{0.5}/V_{1.0}$, i.e., the ratio of nitrogen gas adsorption volume $V_{0.5}$ at a relative pressure $P/P_0 = 0.5$ to the adsorption volume $V_{1.0}$ at a relative pressure $P/P_0 =$ about 1.0 on nitrogen gas adsorption isotherm becomes 0.4 or smaller.

In the second aspect of this invention, on the other hand, the granulated particles obtained are, after hardened or anti-melt treated at 120° C. to 250° C. in an air stream, or directly heat-treated at 800° C. to 2600° C. in an inert gas under pressure of 1 to 8 $kgf/cm^2G$ to obtain the packing material for liquid chromatography of this invention. If the particles are heat-treated under pressure, degasification from the sample is kept under control and, as compared with the heat-treatment under vacuum or in an inert gas stream, the graphitization (carbonization) yield is large, and large pores that are unnecessary for separation are prevented from being generated. It is therefore possible to design the specific surface area and the total pore volume to those that are preferable to separation and, consequently, to obtain a packing material of weak adsorption force. If the heat-treating temperature is below 800° C., the mechanical strength of the packing material obtained is insufficient and the adsorption force is too strong. If the heat-treating temperature is above 2600° C., it is not preferable in that the degree of crystallization becomes excessive and consequently that the elution behavior is changed If the pressure is below 1 $kgf/cm^2G$, there is no better effect than the heat-treatment in vacuum or in an inert gas stream. If the pressure is above 8 $kgf/cm^2G$, it is not preferable in that the graphitization is accelerated with a resultant excessive degree of crystallization.

Where multitudes of micropores which are irrelevant to the separation are present, the micropores which are relatively effective in separation become less and the peaks become broad, resulting in fewer plate numbers, even if very fine perforations are present all over the packing material and a sufficient value may have been attained as a packing material for liquid chromatography in point of specific surface area according to BET. This is not preferable. Therefore, the packing material obtained is made such that the ratio $V_{0.5}/V_{1.0}$, i.e., the ratio of nitrogen gas adsorption volume $V_{0.5}$ at a relative pressure $P/P_0 = 0.5$ to the adsorption volume $V_{1.0}$ at a relative pressure $P/P_0 =$ about 1.0 on nitrogen gas adsorption isotherm becomes 0.2 or smaller.

In order to obtain higher plate numbers when the packing material is filled into a column, it is preferable to closely pack it in a wet method without giving rise to unnecessary spaces in the column. For this purpose, the closer to a true sphere the packing material is, the more effective can it be packed. As an index to show how the obtained packing material is close to a sphere, the ratio $L_{min}/L_{max}$ of a minor axis diameter $L_{min}$ to a major axis diameter $L_{max}$ can be used. If this ratio is 1, the particle is a true sphere. Suppose that the definition is made such that the smaller than 1 becomes the ratio, the farther away the packing material becomes from a true sphere. If the shape of the packing material of this invention right after granulation is supposed to be $L_{min}/L_{max}=0.9$ to 1.0, the packing material after the heat-treatment will have an $L_{min}/L_{max}=0.95$ to 1.0 which is close to a sphere and is therefore preferable.

A detailed explanation of this invention will be made with reference to embodying examples together with comparative examples. However, it should be noted that this invention is not to be limited to such embodying examples.

DETAILED DESCRIPTION OF THE INVENTION

EXAMPLE 1

Figure 1:
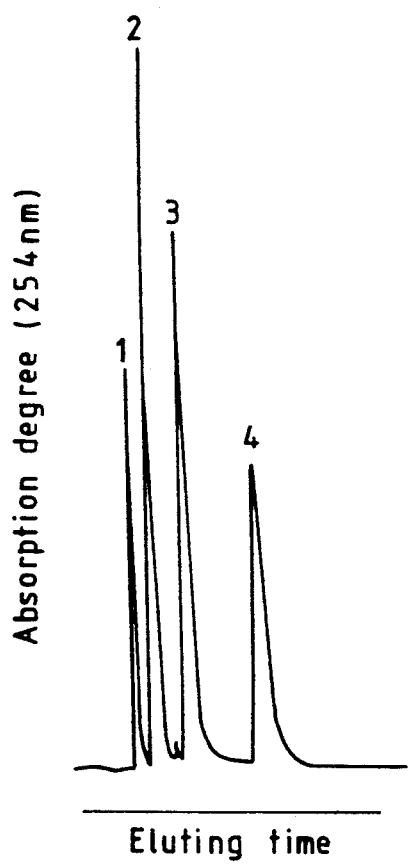
FIG. 1 is a chromatogram in which a mixture of organic compounds was separated in a column filled with a packing material obtained in EXAMPLE 1.

Five hundred (500) parts by weight of commercially available carbon black having a particle diameter of 29 nm, specific surface area of 86 m²/g, a DBP oil absorption amount of 112 ml/100 g, 650 parts by weight of commercially available phenol resin containing 30% of methanol and 1500 parts by weight of methanol were charged into a ball mill. The mill was rotated for 50 hours to make the materials into a slurry. This slurry was granulated by a spray granulation method. The granules thus obtained were charged into a drying furnace of hot air circulation type, were heated up to 140° C. at a temperature rise of 20° C./hour, and were maintained for 1 hour at that temperature to thermally harden them. Then, a sample was transferred to a ceramic crucible and was heated in $N_2$ atmosphere up to 1000° C. at a temperature rise of 200° C./hour. The sample was maintained at that temperature for 1 hour to carry out a primary sintering. Then, the sample was transferred to a graphite crucible and was heated under vacuum up to 2800° C. at a temperature rise of 1000° C./hour. The sample was maintained at that temperature for 0.5 hour to carry out a secondary sintering, thereby obtaining a microstructure carbon material. Particle diameter distribution was 3 to 100 μm. The particles thus obtained were found to be spherical in shape under microscopic examination and the ratio of minor-axis diameter $L_{min}$/major-axis diameter $L_{max}$ was from 0.95 to 0.99. A specific surface area according to BET was 24 m²/g, the ratio of $V_{0.5}/V_{1.0}$ was 0.09, a total micropore volume measured by a mercury porosimeter was 0.95 ml/g, and an average pore diameter was 355 Å.

After classifying the particles thus obtained into 4 to 10 μm, they were filled into a stainless-steel column of 4.6 mm in internal diameter and 15 cm in length. Thereafter, using 70% methanol aqueous solution as an eluent, a mixture of acetone, phenol, p-cresol and 3, 5-xylenol was analyzed. A good separation was obtained as shown in FIG. 1. In FIG. 1, numeral 1 denotes acetone, numeral 2 denotes phenol, numeral 3 denotes p-cresol and numeral 4 denotes 3, 5-xylenol.

EXAMPLE 2

Five hundred (500) parts by weight of carbon black, 1130 parts by weight of phenol resin and 730 parts by weight of methanol, which have the same characteristics as those of the EXAMPLE 1, were mixed in a ball mill to make them into a slurry. The slurry thus obtained was dispersed in silicone oil and vehemently agitated to emulsion-pelletize it into spheres. They were then heated to 140° C. and were held for 6 hours to solidify them. The particles thus obtained were heated for heat treatment in the same manner as in the EXAMPLE 1 to carry out a primary sintering, and a secondary sintering was carried out at 2000° C. for 1 hour. The particles thus obtained were 2 to 30 μm in particle diameters. The ratio of $L_{min}/L_{max}$ was from 0.98 to 1.0, a specific surface area according to BET was 60 m²/g, the ratio of $V_{0.5}/V_{1.0}$ was 0.05, a total micropore volume was 0.3 ml/g and an average micropore diameter was 210 Å.

Figure 2:
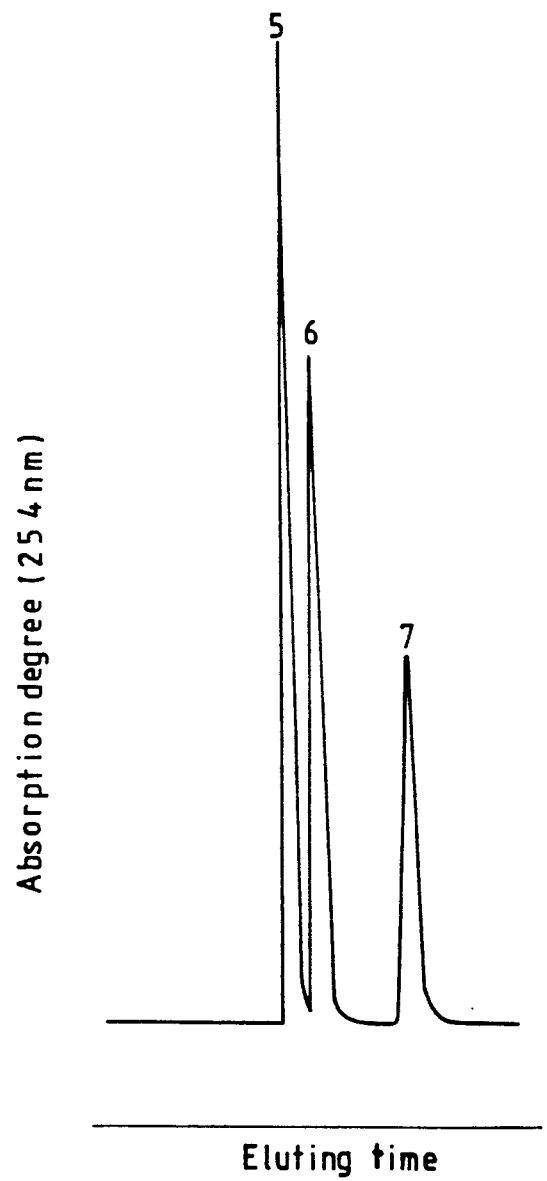
FIG. 2 is a chromatogram in which a mixture of an organic compound was separated in a column filled with a packing material obtained in EXAMPLE 2.

After classifying the particles thus obtained into 4 to 10 μm, they were filled into a stainless-steel column of 4.6 mm in internal diameter and 15 cm in length. Thereafter, using methanol as an eluent, a mixture of dimethyl phthalate, diallyl phthalate and dinormal butyl phthalate was analyzed. A good separation was obtained as shown in FIG. 2. In FIG. 2, numeral 5 denotes dimethyl phthalate, numeral 6 denotes diaryl phthalate and numeral 7 denotes dinormal butyl phthalate.

EXAMPLE 3

Five hundred (500) parts by weight of commercially available carbon black having a particle diameter of 18 nm, 500 parts by weight of toluene-soluble component of coal-tar pitch having a softening point of 82.5° C. and 1800 parts by weight of toluene were mixed, slurried and then granulated by a spray granulation method. The particles thus obtained were transferred into a stainless-steel tray and were heated to a temperature of 260° C. at a temperature rise of 5° C./hour in a dryer of hot-air circulation type. They were held at that temperature for 1 hour for anti-melt treatment of the coal-tar pitch. In addition, a primary sintering was carried out in the same manner as in the EXAMPLE 1 and a secondary sintering was carried out at 2000° C. for 1 hour. The particles thus obtained were 2 to 120 μm in particle sizes. The ratio of $L_{min}/L_{max}$ was from 0.96 to 0.98, a specific surface area according to BET was 120 m²/g, the ratio of $V_{0.5}/V_{1.0}$ was 0.20, a total micropore volume was 0.95 ml/g and an average micropore diameter was 120 Å.

The particles thus obtained were used in the same way as in the EXAMPLE 2, and the separation was found good.

EXAMPLE 4

Five hundred (500) parts by weight of carbon black as used in the EXAMPLE 3, 500 parts by weight of divinyl benzene resin and 1200 parts by weight of toluene were mixed together to make them into a slurry and thereafter were granulated by a spray granulation method. The particles thus obtained were subjected to a pre-heat treatment and a primary as well as a secondary sintering in the same manner as in the EXAMPLE 3. The particles thus obtained were 2 to 180 μm in particle diameter. The ratio of $L_{min}/L_{max}$ was from 0.95 to 0.98, a specific surface area according to BET was 80 m$^2$/g, the ratio of $V_{0.5}/V_{1.0}$ was 0.32, a total micropore volume was 0.5 ml/g and an average micropore diameter was 253 Å.

The particles thus obtained were used in the same manner as in the EXAMPLE 2, and the separation was found good.

EXAMPLE 5

Five hundred (500) parts by weight of commercially available carbon black having an average particle diameter of 20 nm, a specific surface area of 220 m$^2$/g and a DBP oil absorption amount of 115 ml/100 g, 1100 parts by weight of furfural resin and 350 parts by weight of ethanol were charged into a ball mill, and the mill was rotated for 50 hours to make them into a slurry. The slurry thus obtained was granulated and heat-treated in the same manner as in the EXAMPLE 2 and was finally heat-treated at 1600° C. for 1 hour. The particles thus obtained were 2 to 5 μm in particle size. The ratio of $L_{min}/L_{max}$ was from 0.97 to 0.99, a specific surface area according to BET was 32 m$^2$/g, the ratio of $V_{0.5}/V_{1.0}$ was 0.18, a total micropore volume was 0.8 ml/g and an average micropore diameter was 240 Å.

The particles thus obtained were used in the same manner as in the EXAMPLE 2, and the separation was found good.

EXAMPLE 6

The packing material obtained in the EXAMPLE 1 was filled into a stainless-steel column, and a comparison in respect of acid resistivity and alkali resistivity was made between it and a stainless-steel column filled with a silica gel packing material (ODS) having chemically combined octadecyl radical. A mixture of 0.1 M chloric acid and acetonitrile in 1:1 by volume was used as an eluent to examine the position of elution of naphthalene. In case of the ODS column, the position of elution of naphthalene 120 hours after filling the eluent was quickened to 85% that of an initial position. However, in the case of the column filled according to this EXAMPLE, there was seen no change in the position of elution even 120 hours after filling the eluent. In addition, a mixture of 0.1 M NaOH and acetonitrile in 1:1 by volume was used as an eluent to examine the position of elution of naphthalene. In the case of the ODS column, the peak became broad 2 hours after filling the eluent, and a void was found to have occurred at the entrance of the column. On the other hand, in the case of the column filled with the packing material of this EXAMPLE, there was seen no change in the position of elution of naphthalene even 100 hours after filling the eluent.

COMPARATIVE EXAMPLES 1 to 6

The same carbon black as that in the EXAMPLE 1 as well as various kinds of carbon black were used in mixing with phenol resin and methanol as binder in ratios as shown in Table 1, and carried out up to the secondary sintering under the conditions as shown in the EXAMPLE 1. The characteristics of the particles thus obtained are shown in Table 1.

These particles were used in the same manner as that in the EXAMPLE 2 with the results as shown in Table 1. The results were found unfavorable.

TABLE 1

| COMPAR-ATIVE EXAMPLE | Carbon black/ Phenol resin/Methanol (weight basis) | $L_{min}/L_{max}$ | Specific surface area (m$^2$/g) | $V_{0.5}/V_{1.0}$ | Micropore volume (ml/g) | Chromatographic Chracteristics | Remarks |
| --- | --- | --- | --- | --- | --- | --- | --- |
| 1 | 1.0(EXAMPLE 1)/ 1.0/4.5 | 0.95–0.98 | 21 | 0.22 | 1.0 | cracked at filling | many microparticles |
| 2 | 1.0(EXAMPLE 1)/ 1.2/0.8 | 0.65–0.88 | 59 | 0.45 | 1.25 | weak retention force, insufficient separation | coagulated particles* |
| 3 | 1.0(EXAMPLE 1)/ 0.3/1.5 | 0.51–0.78 | 21 | 0.31 | 0.95 | cracked at filling | many coagulated particles |
| 4 | 1.0(EXAMPLE 1)/ 2.8/1.5 | 0.67–0.85 | 29 | 0.08 | 0.3 | weak retention force, insufficient separation | non-spherical particles |
| 5 | 1.0(particle dia. 80 nm)/ 1.0/1.5 | 0.90–0.98 | 2 | 0.12 | 0.61 | weak adsorption force, sample not retained | fragile |
| 6 | 1.0(particle dia. 10 nm)/ 1.0/1.5 | 0.80–0.98 | 200 | 0.50 | 0.55 | broad peak width occurred | coagulation |

*grape's cluster-like particles

COMPARATIVE EXAMPLE 7

Commercially available spherical phenol resin was heat-treated under the same conditions as in the EXAMPLE 1, and then the secondary sintering was carried out at 1500° C. for 1 hour to obtain particles. The particles had a specific surface area according to BET of 0.3 m$^2$/g and a total micropore volume of 0.0002 ml/g. The particles thus obtained were classified into 4 to 10 m, and a mixture of an organic compound as in the EXAMPLE 1 was analyzed. There was no separation at all.

EXAMPLE 7

One (1) part by weight of carbon black having a particle diameter of 18 nm, a specific surface area of 163 m$^2$/g and DBP oil absorption amount of 115 ml/100 g, 1.8 parts by weight of phenol resin and 1 part by weight of methanol as a diluent were mixed in a ball mill for 50 hours to obtain a slurry. This slurry was charged into silicone oil and was vehemently agitated to carry out a wet-method granulation (i.e., spheroidizing). It was then heated together with the silicone oil and was held at 140° C. for 1 hour. After solid-liquid separation, it was washed well with a solvent and dried and was transferred to a ceramic crucible. Then, after replacing the system with nitrogen gas, it was heated in nitrogen gas up to 1000° C. at a heating speed of 200° C./h under pressure of 2 kgf/cm$^2$G and was held for 1 hour to carry out a primary sintering. It was further transferred to a graphite crucible, was heated up to 2200° C. at a heating speed of 200° C./h under argon gas pressure of 5.5 kgf/cm$^2$G, and was held for 0.5 hour to carry out a secondary sintering. The spherical particles thus obtained had the following characteristics. Namely, an average particle diameter was 5.5 μm, a particle diameter distribution was 2 to 35 μm, the ratio being of $L_{min}/L_{max}$ was from 0.98 to 1.0, a specific surface area was 24 m$^2$/g, the ratio of $V_{0.5}/V_{1.0}$ was 0.10, a total micropore volume was 0.22 ml/g, a graphitic layer spacing was 3.45 Å and a thickness of the graphitic layer was 50 Å.

Figure 3:
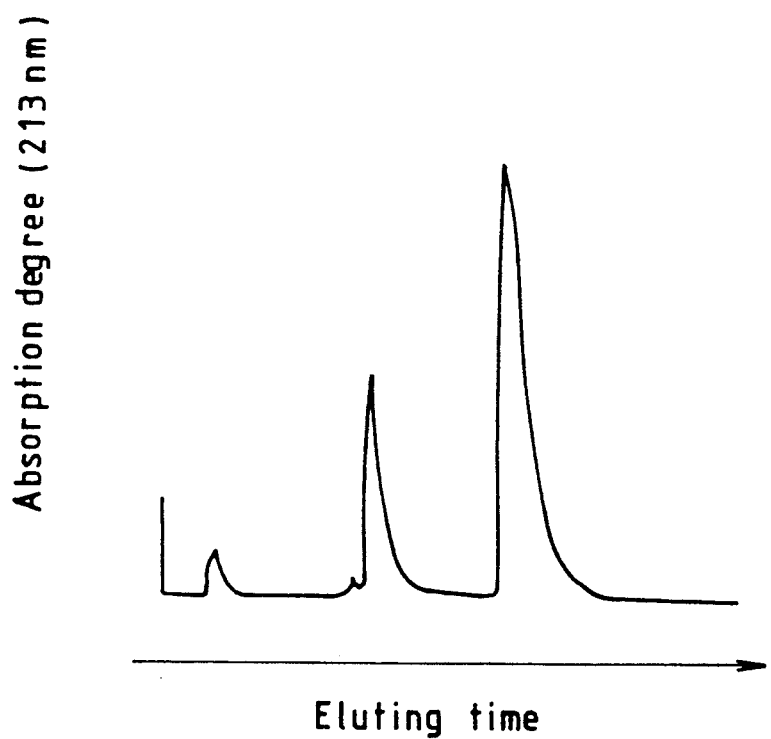
FIG. 3 is a chromatogram in which dihidrocarvone isomer is separated in a column filled with a packing material obtained in EXAMPLE 7.

The particles thus obtained were classified into 3 to 8 m. After filling them in wet method into a stainless-steel column of 4.6 mm in internal diameter and 10 cm in length, an analysis was carried out of dihidrocarvone isomer with 50% methanol aqueous solution as eluent. A good separation as shown in FIG. 3 was obtained.

EXAMPLE 8

One (1) part by weight of the same carbon black as used in the EXAMPLE 7 and 1.5 parts by weight of phenol resin with an addition of 20% of toluene-soluble component of coal-tar pitch and 1 part by weight of toluene were mixed in a ball mill for 50 hours to obtain a slurry. The slurry thus obtained was charged into silicone oil and was vehemently agitated to granulate it in a wet method (spheroidizing). Then, the granules were heated together with the silicone oil and held at 150° C. for 2 hours. After solid-liquid separation, the granules were washed well with a solvent and were dried. After leaving them in the air at 250° C. for 4 hours, a primary sintering was carried out in the same way as in the EXAMPLE 7. They were then transferred to a graphite crucible and was heated in nitrogen up to 1800° C. at a heating speed of 300° C./h under pressure of 2.0 kgf/cm$^2$G. They were held at that temperature for 1 hour to carry out a secondary sintering. Spherical particles thus obtained had the following characteristics. Namely, an average particle diameter was 4.8 μm, a particle size distribution was 2 to 45 μm, the ratio of $L_{min}/L_{max}$ was 0.96 to 0.99, a specific surface area was 18 m$^2$/g, the ratio of $V_{0.5}/V_{1.0}$ was 0.08, a total micropore volume was 0.15 ml/g, a graphitic layer spacing was 3.41 Å and a thickness of the carbon layer was 75 Å.

These particles were classified into 3 to 8 μm. They were filled into a column in the same manner as in the EXAMPLE 7 and tested. A good separation was obtained.

COMPARATIVE EXAMPLES 8 to 12

Using the same carbon black as in the EXAMPLE 7 as well as various kinds of carbon black, phenol resin and methanol were charged together into a ball mill in ratios as shown in Table 2 to slurry them. The slurry was thereafter granulated by the method as shown in the EXAMPLE 7 and then was subjected up to the secondary sintering. The characteristics of the particles thus obtained are shown in Table 2. These particles were classified into 3 to 8 μm and were used by filling them into a column in the method as shown in the EXAMPLE 7. The results were as shown in Table 2 and were found to be unfavorable.

TABLE 2

| COMPARATIVE EXAMPLE | 8 | 9 | 10 | 11 | 12 |
|---|---|---|---|---|---|
| CB/PR/M*1 | 1/1/2 (particle diameter 12 nm)*2 | 1/1/0.7(particle diameter 80 nm)*3 | 1/4/0.25 (EXAMPLE 7) | 1/2/1 (EXAMPLE 7) | 1/2.5/1 (EXAMPLE 7) |
| Primary sintering | | | | | |
| Pressure (kgf/cm$^2$G) | nitrogen gas flow | 1.5 | 1.5 | 2.0 | 5.0 |
| Temperature (°C.) | 1000 | 1000 | 1000 | 1000 | 1000 |
| Secondary sintering | | | | | |
| Pressure (kgf/cm$^2$G) | vaccum | 1.5 | 3.0 | 2.0 | 9.0 |
| Temperature (°C.) | 1600 | 2000 | 2000 | 3000 | 2400 |
| Average particle diameter(μm) | 2.2 | 5.4 | 3.5 | 6.0 | 5.2 |
| Particle size distribution(μm) | 1–40 | 2–60 | 2–250 | 3–100 | 2–60 |
| $L_{min}/L_{max}$ | 0.50–0.97 | 0.80–0.98 | 0.60–0.94 | 0.65–0.90 | 0.95–0.99 |
| Specific surface area (m$^2$g) | 160 | 7 | 6 | 8 | 15 |
| $V_{0.5}/V_{1.0}$ | 0.44 | 0.13 | 0.03 | 0.06 | 0.05 |
| Total pore volume (ml/g) | 0.44 | 0.50 | 0.05 | 0.08 | 0.08 |
| d(002) Å | 3.46 | 3.47 | 3.48 | 3.38 | 3.38 |
| Lc(002) Å | 42 | 45 | 28 | 120 | 90 |
| Chromatographic characteristics | strong retention force, broad peak, some tailings | weak retention force | weak retention force, insufficient peak separation | insufficient separation, broad peak | some tailings, broad peak |
| Remarks | including non-spherical particles | too many micropores, not suitable | many coagulated particles | including non-spherical particles, many coagulated | |

TABLE 2-continued

| COMPARATIVE EXAMPLE | 8 | 9 | 10 | 11 | 12 |
| --- | --- | --- | --- | --- | --- |
| | | | | | particles |

NOTE ON TABLE 2
*1 CB/PR/M denotes mixing ratio of carbon black/phenol resin/methanol.
*2 Carbon black in COMPARATIVE EXAMPLE 8 has an average particle diameter of 12 nm, a specific surface area of 432 m$^2$/g and a DBP oil absorption amount of 96 ml/100 g.
*3 Carbon black in COMPARATIVE EXAMPLE 9 has an average particle diameter of 80 nm, a specific surface area of 25 m$^2$/g and a DBP oil absorption amount of 63 ml/100 g.
*4 Phenol resin of COMPARATIVE EXAMPLE 11 with an addition of 40% of toluene-soluble component of coal-tar pitches.
*5 Toluene was used as a diluent in COMPARATIVE EXAMPLE 11.

COMPARATIVE EXAMPLE 13

Figure 4:
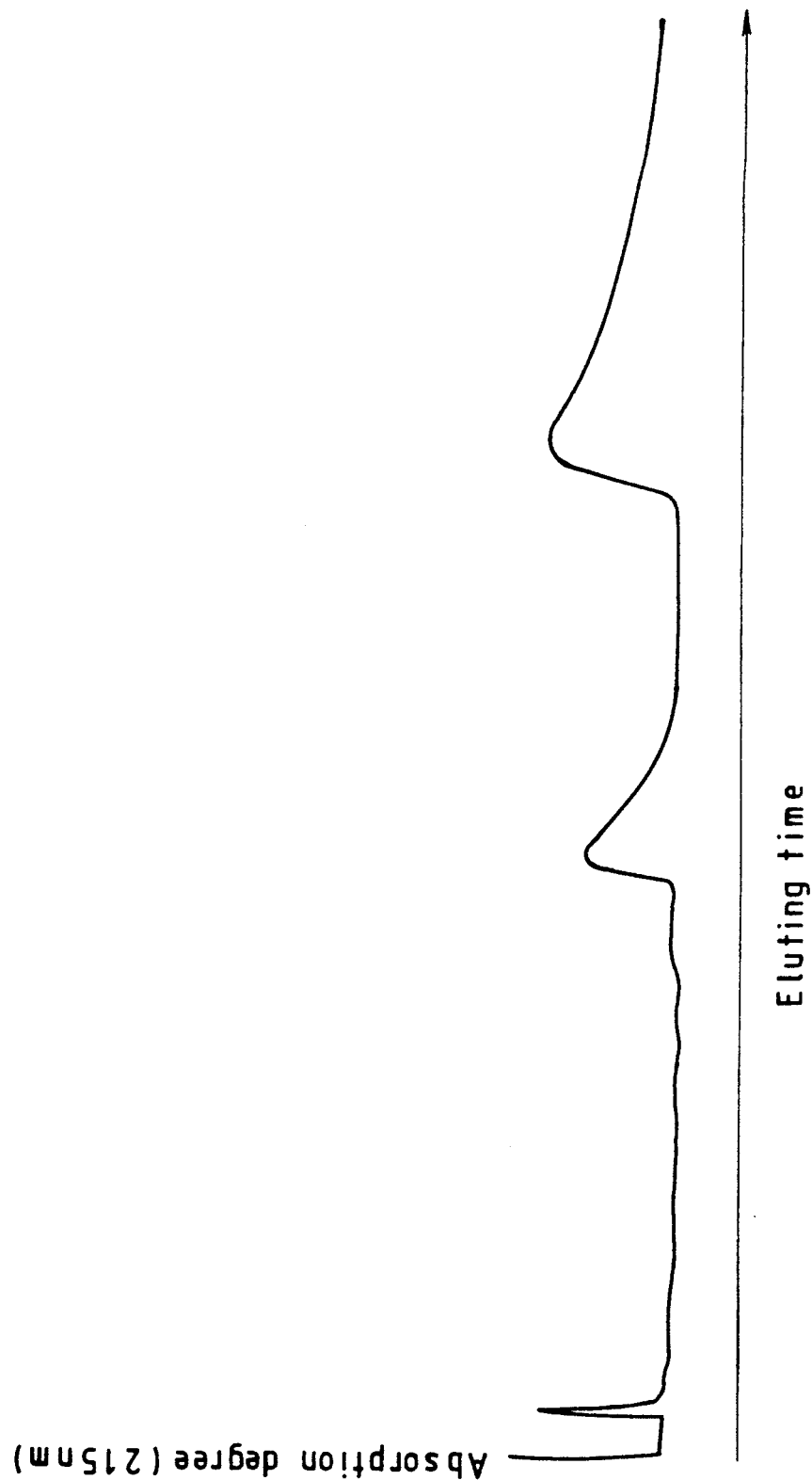
FIG. 4 is a chromatogram in which dihidrocarvone isomer was separated in a column filled with a packing material obtained in COMPARATIVE EXAMPLE 14.

A commercially available carbon-based packing material and a column (4.6 mm in internal diameter and 10 cm in length), were used in the same manner as in the EXAMPLE 7. Then, the elution of the peak was late, and a broad peak as shown in FIG. 4 appeared at a position of 3.2 times that of the EXAMPLE 7, and the tailing was also large.

As described above, according to this invention, when carbon black having appropriate properties is reinforced by an appropriate amount of graphitizing binder and is then graphitized, it is possible to obtain a packing material which is provided with the necessary characteristics required of a packing material for liquid chromatography.

In addition, since the packing material of this invention is entirely made up of carbon, it can be used over ranges of pH 1 to pH 14. It further has solved the problem in that the conventional carbon-based packing material is strong in adsorption force.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the scope of the invention.

What is claimed is:

1. A packing material for liquid chromatography comprising carbon particles having a ratio $L_{min}/L_{max}$ of a minor axis diameter $L_{min}$ to a major axis diameter $L_{max}$ of 0.95 to 1.0, a particle diameter of 2 to 200 μm, a porous surface, a specific surface area of 10 to 650 m$^2$/g and a total micropore volume of 0.3 to 2.0 ml/g, produced by the process of:

a) mixing 1.0 part by weight of carbon black of particle diameter of 12 to 40 mm, 0.5 to 2.5 parts by weight of at least one synthetic resin which can be graphitized by heating and a toluene-or benzene-soluble component of pitches, and an organic solvent to form a mixture;

b) granulating said mixture by spray granulation or emulsion granulation to form granules; and c) heat treating said granules at 800° to 3,000° C.

2. A packing material for liquid chromatography according to claim 1 having a particle diameter of 2 to 200 μm, a specific surface area of 15 to 50 m$^2$/g, a total micropore volume of 0.08 to 0.3 ml/g.

3. A packing material for liquid chromatography according to claim 2, wherein said carbon particles are produced by heat-treating porous spherical particles in an inert gas under pressure of 1 to 8 kgf/cm$^2$G, said spherical particles comprising carbon black particles, one or a mixture of a synthetic resin which can be graphitized by heating, and a toluene- or benzene-soluble component of coal-tar pitches or petroleum pitches, said soluble component being added to increase a graphitizing yield.

4. A packing material for liquid chromatography according to claim 2 or 3, wherein graphitic layer distance d(002) determined by X-ray analysis is 3.40 to 3.47 Å and wherein a thickness of said graphitic layer Lc(002) is 30 to 80 Å.

5. A method of manufacturing a packing material for liquid chromatography comprising:

mixing 1.0 part by weight of carbon black, 0.5 to 2.5 parts by weight of one or a mixture of a synthetic resin which can be graphitized by heating and a toluene- or benzene-soluble component of pitches, and an organic solvent to obtain a mixture, said carbon black having a particle diameter of 12 to 40 nm, a specific surface area of 50 to 650 m$^2$/g, a DBP oil absorption amount of 50 to 150 ml/100 g, said synthetic resin being one selected from phenol resin, furan resin, furfural resin, divinylbenzene resin and urea resin, said pitches being ones selected from petroleum pitches, coal-tar pitches and liquefied coal oil;

granulating said mixture by spray granulation or emulsion granulation to obtain granules whose ratio $L_{min}/L_{max}$ of a minor axis diameter $L_{min}$ to a major axis diameter $L_{max}$ is 0.90 to 1.0; and heat-treating said granules at 800° to 3000° C. in an inert atmosphere.

6. A method of manufacturing a packing material for liquid chromatography according to claim 5, wherein said packing material has a particle diameter of 2 to 200 μm, a porous surface, a specific surface area of 10 to 650 m$^2$/g, a total micropore volume of 0.3 to 2.0 ml/g and a ratio $V_{0.5}/V_{1.0}$ of 0.4 or smaller, said ratio being of nitrogen gas adsorption volume $V_{0.5}$ at a relative pressure $P/P_0$ of 0.5 to nitrogen gas adsorption volume $V_{1.0}$ at a relative pressure $P/P_0$ of about 1.0 on nitrogen gas adsorption isotherm.

7. A method of manufacturing a packing material for liquid chromatography comprising:

mixing 1.0 part by weight of carbon black, 1.0 to 3.0 parts by weight of one or a mixture of a synthetic resin which can be graphitized by heating, and 10 to 25% of a toluene- or benzene-soluble component of pitches, and an organic solvent to obtain a mixture, said carbon black having a particle diameter of 12 to 30 nm, a specific surface area of 80 to 250 m$^2$/g, a DBP oil absorption amount of 80 to 200 ml/100 g, said pitches being ones selected from the group consisting of petroleum pitches, coal-tar pitches and liquefied coal oil;

granulating said mixture in a wet emulsion to obtain granules whose ratio $L_{min}/L_{max}$ of a minor axis diameter $L_{min}$ to a major axis diameter $L_{max}$ is 0.90 to 1.0; and then heat-treating said granules in an inert gas at 800° to 2600° C. under pressure of 1 to 8 kgf/cm²G.

8. A method of manufacturing a packing material for liquid chromatography according to claim 7, wherein the resultant packing material has a particle diameter of 2 to 200 μm, a porous surface, a specific surface area of 15 to 50 m²/g, a total micropore volume of 0.08 to 0.3 ml/g and a ratio.

* * * * *

UNITED STATES PATENT AND TRADEMARK OFFICE
CERTIFICATE OF CORRECTION

PATENT NO. : 5,270,280
DATED : December 14, 1993
INVENTOR(S) : ICHIKAWA et al.

It is certified that error appears in the above-indentified patent and that said Letters Patent is hereby corrected as shown below:

Column 13, on line 9 of Claim 1, "40 mm" should read --40 nm--.

Column 16, on line 6 of Claim 8, delete "and a ratio".

Signed and Sealed this

Second Day of August, 1994

Attest:

BRUCE LEHMAN

Attesting Officer

Commissioner of Patents and Trademarks